July 9, 1946.　　　　R. W. GILBERT　　　　2,403,521

ELECTRONIC MICROAMMETER

Filed Aug. 20, 1943

Inventor:

Roswell W. Gilbert,

By Pierce & Scheffler,

Attorneys.

Patented July 9, 1946

2,403,521

UNITED STATES PATENT OFFICE 2,403,521

ELECTRONIC MICROAMMETER

Roswell W. Gilbert, Montclair, N. J., assignor to Weston Electrical Instrument Corporation, Newark, N. J., a corporation of New Jersey Application August 20, 1943, Serial No. 499,417

6 Claims. (Cl. 171—95)

1

This invention relates to an electronic ammeter for the measurement of direct currents of an order substantially below the minimum values that can be measured directly by sensitive permanent magnet-movable coil instruments, and more particularly to electronic microammeters of small size that are fully portable and therefore adapted for use in the field.

Various types of electronic or "vacuum tube voltmeters" have been proposed, and these instruments have been employed in the measurement of small current values by passing the current through a resistor, and impressing the resultant voltage drop upon the grid of the voltmeter input tube. The range of current measurements was limited, however, and the present invention extends the measuring range into new regions of minute currents of the order of small fractions of a microampere.

Objects of the invention are to provide novel electronic ammeters for the measurement of extremely small currents of the order of a microampere and less. An object is to provide an electronic microammeter that functions on voltage variations, the microammeter including a current-balancing network for degeneratively compensating the amplifier gain in such manner that the voltage output is a measure of the current input. Other objects are to provide electronic microammeters that may be energized from the conventional light and power circuits, usually a 60 cycles per second circuit, and that have an accuracy and a stability of operation that are not substantially affected by fluctuations in the voltage of the energizing source.

These and other objects, and the advantages of the invention, will be apparent from the following specification when taken with the accompanying drawing in which.

The method of operation of microammeters embodying the invention may be most readily understood by considering first the characteristics of simplified circuits that are the electrical equivalents of portions of, and of, the electronic current measuring circuit.

Figure 1:
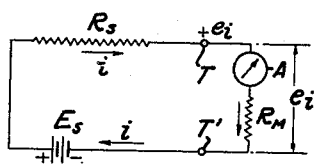
Figs. 1, 2 and 3 are diagrams of circuits that are the electrical equivalents of an electronic current measuring circuit, or portions thereof, embodying the invention.

As indicated by the Fig. 1 circuit diagram, the current $i$ that a direct current source Es establishes through a resistive load Rs may be measured by connecting the source and load across the terminals T, T' of a measuring circuit comprising an ammeter A having a resistance $Rm$. A positive potential $e_1$ is established at the terminal T by the flow of current $i$ through the measuring circuit, and this potential varies with and is a measure of the magnitude of the current. The source Es and load Rs may be disconnected from the terminals T, T' and replaced by a circuit network, see Fig. 2, that is adjustable to establish a current of the same value $i$, but in the reverse sense, through the measuring circuit A, $Rm$. The network includes a resistor R in series with a direct current source of adjustable voltage value $e$ that is shown schematically as a potentiometer resistance $Rl$ connected across a battery E. The positive terminal of battery E is connected to the terminal T' of the measuring circuit, and the resistor R is connected between the terminal T and the potentiometer tap. A voltmeter V is connected between the potentiometer tap and the positive terminal of the battery E to register the particular voltage value $e$ which esablishes a reverse current of the desired value $i$ in the measuring circuit.

Figure 2:
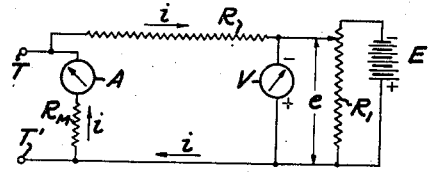
Figure 3:
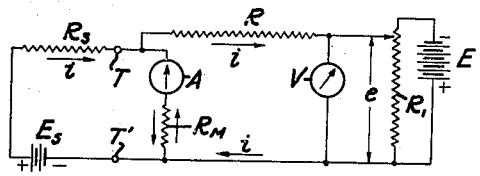

The current sources Es and E of the networks of Figs. 1 and 2 thus establish equal currents $i$, in opposite sense, through the measuring circuit and, if both networks are connected across the measuring circuit as shown in Fig. 3, the current in the measuring circuit is balanced out, i. e. is reduced to zero. The measuring circuit A, $Rm$ may therefore be opened or removed without affecting voltage or current conditions at any point in the connected current source network and current balancing network. The source current $i$ is absorbed in the resistor R of the current balancing network when the measuring circuit is opened or is of substantially infinite resistance, and the magnitude of the source current $i$ may be indicated by an appropriate graduation of the scale of the voltmeter V since the "balancing" voltage $e$ varies with the current $i$ for any predetermined value of the resistor R.

Figure 4:
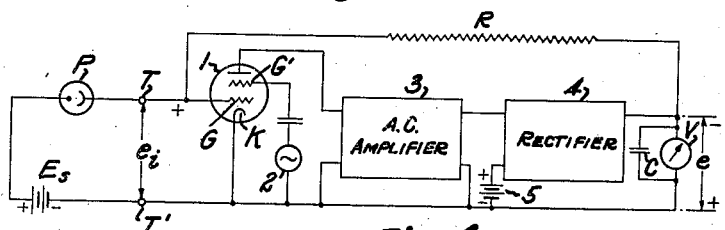
Fig. 4 is a schematic circuit diagram of an embodiment of the invention.

A manual adjustment of the potentiometer along resistance $Rl$ to establish a current balance condition is obviously undesirable, and the basic circuit arrangement for obtaining an automatic current balance is illustrated schematically in Fig. 4. The source circuit, in which the current is to be measured may comprise a direct current source Es and a variable resistance element that, as shown, is a phototube P. The source circuit is connected across the microammeter input terminals T, T' that are joined to the grid G and cathode K, respectively, of a modulator tube 1. An alternating current potential is establishing on a second grid G' by a source 2 that may be, and preferably is, a conventional 60 cycles light or power circuit. The modulated output of tube 1, which is proportional to the grid input, is amplified by the alternating current amplifier 3 and impressed upon a rectifier that is biased, by a battery or other direct current source 5, to block all direct current output in the absence of amplifier voltage output peaks less than some predetermined level. This insures the return of the pointer of the voltmeter V to zero position in spite of hum and spurious amplifier output components which, except for the blocking bias, would establish a rectifier output. A condenser C may be, and preferably is, shunted across the instrument V to smooth out ripple components in the output of the rectifier. The voltmeter V is connected across the rectifier to measure the output voltage $e$, and the resistor R is connected between the negative potential terminal of rectifier 4 and the control grid G of the modulator tube 1.

The operation of the current-measuring circuit of Fig. 4 may be considered, for simplicity of explanation without resort to a mathematical analysis, as analogous to that of the Fig. 3 circuit. The current $i$ through the phototube P varies with the intensity of the light reaching the phototube, and this current may be considered as flowing through the grid-cathode impedance of tube 1 to establish a correspondingly varying positive potential $e_1$ on the control grid G. This grid bias modulates the tube output which, after amplification, is rectified to develop an output voltage $e$ that varies with the grid bias $e_1$ and therewith with the input current $i$. The condition of zero current in the measuring circuit, as described above with reference to the Fig. 3 circuit, is established when the amplifier 3 is adjusted to provide a rectified output voltage $e$ that, for any grid bias $e_1$ developed by the input current $i$, establishes a reverse current $i$ in the balancing network. Actually, however, the input modulator tube 1 functions on voltage variation and draws no appreciable current, so the entire input current is absorbed in the degenerative resistor R. A current balance is thus established at any given input current $i$ that maintains a definite relation between the grid bias $e_1$ and the rectified output voltage $e$, and the output voltage $e$ therefore fluctuates with and is a measure of the input current $i$. The scale of the voltmeter V may therefore be calibrated directly in values of the input current $i$. The current balance condition depends upon the magnitude of the degenerative resistor R, and a plurality of current ranges may be incorporated in the microammeter by providing a plurality of resistors of different values and a range-change switch for connecting the desired resistor into the measuring system.

Figure 5:
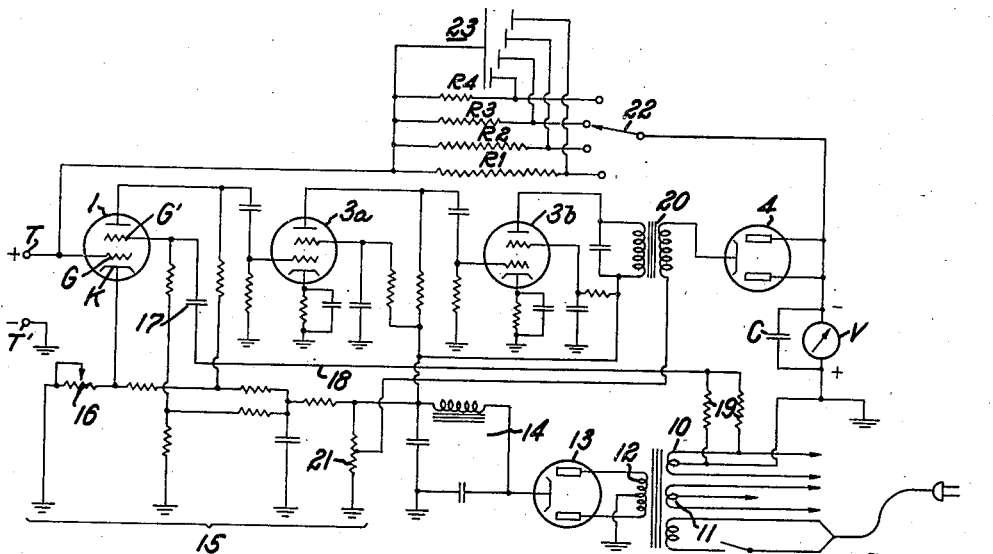
Fig. 5 is a circuit diagram of a multirange electronic microammeter embodying the invention.

The complete circuit diagram of a multirange microammeter embodying the invention is shown in Fig. 5. The general design and the physical construction of the electron tube circuits conform to good practice in the radio field, and various conventional circuit elements of the illustrated modulator-amplifier-rectifier system will not be separately identified by reference numerals. The several tubes are of the indirectly-heated cathode type, and the usual "power supply unit" is employed for energizing the microammeter from a 110–120 volts, 60 cycles alternating current light or power circuit. The power transformer has center-tapped secondary windings 10, 11 supplying low voltage alternating current to the cathode-heater circuits, not shown, and a secondary winding 12 supplying high voltage current to a full-wave rectifier tube 13. The rectified output of tube 13 flows through the filter 14 and the voltage divider 15 to which the plate and screen grid elements of the modulator tube 1 and amplifier tubes $3a$, $3b$ are connected.

The input terminals T, T' of the microammeter are connected to the control grid G of tube 1 and to ground, i. e. to the chassis of the apparatus, respectively. The cathode K of tube 1 is connected to the chassis through the resistance 16 of the voltage divider, the resistance being adjustable to eliminate spurious output voltages that may appear as a result of leakage. This shielding against leakage effects is essential in the accurate measurement of currents of the order of microamperes and less, and it is attained by terminating all insulation at approximately the same potential as the grid G of modulator tube 1. All insulation is tied to the chassis, and the circuit is checked for correct operating conditions by short-circuiting the input terminals T, T' and adjusting the resistance 16 to obtain a zero reading at the output voltmeter V. The modulator grid G' and the chassis are at the same potential, since they are directly connected, and leakage effects are cancelled out by adjusting the potential of cathode K to such positive value that meter V reads zero when there is no current between the input terminals. Having balanced out all spurious potentials, the short circuit is removed from the terminals T, T' and the meter V will then respond only to changes of input current.

An alternating current voltage is applied to grid G' of tube 1 through condenser 17, lead 18, and voltage divider resistances 19 that are connected across a section of the winding 10 of the power transformer. Resistance couplings are provided to the amplifier tubes $3a$, $3b$, and the secondary winding of the input transformer 20 of rectifier 4 is returned to the voltage divider 21 to impress a bias on rectifier 4 to suppress hum and spurious amplifier output components.

A plurality of degenerating resistors R1—R4 of different values are preferably included for a control of the measuring range of the apparatus, the desired range being selected by adjustment of switch 22 to connect the appropriate degenerating resistor between the rectifier output circuit and the grid G of modulator tube 1. The resistors R1—R4 have distributed capacities to ground that must be charged before a current that is applied to the right hand terminal of a degenerating resistor appears at the opposite end. Expressed differently, an appreciable time lag is encountered before the voltage at the modulator grid G assumes a balanced condition in response to the output current flowing through the degenerating resistor. In practice, this time lag sets up a "hunting" condition in the circuit that causes the pointer of the output meter V to oscillate continuously.

The time lag is eliminated by connecting a bank of small degenerating condensers 23 across the degenerating resistances, whereby any change in the direct current output voltage is transmitted immediately by the small condenser and appears at the modulator grid independently of distributed capacity to ground along the degenerating resistors. A rapid circuit balance is thus obtained, and the pointer of the output meter V moves to a definite position that is a measure of the input current.

The invention is not restricted to any particular range of current measurements and the following data as to one practical embodiment of the invention should not be viewed as a limitation to the specified values of circuit elements or to the stated current ranges. The voltmeter V was a conventional direct current instrument having a full scale deflection at 50 volts, 10,000 ohms per volt, and the modulator-amplifier circuits were designed to develop a rectifier output of 50 volts at a modulator grid potential of +0.5 volt. The degenerating resistors R1—R4 had values of 50,000; 5,000; 500 and 50 megohms respectively, and the corresponding top values of the several measuring ranges were 0.001, 0.01, 0.1 and 1.0 microampere. The calibration of the apparatus was substantially independent of all factors except the values of the degenerative resistors R1—R4, and was particularly insensitive to changes in the voltage of the 60 cycles power supply. The error produced by plus or minus 20% voltage variation from the design center 117 volts was approximately 0.5%.

While I have illustrated and specifically described an electronic circuit employing a vacuum tube modulator, it is apparent that the other types of non-linear modulating devices may be employed such as, for example, rectifier ring modulator, or vibrating contact modulator. The vacuum tube modulator is preferred because of its sensitivity which makes it particularly adaptable to the production of a practical device of extremely low current measuring range. Electronic ammeter circuits in which the input current is absorbed or dissipated in a degenerating resistor are believed to be broadly new, and it is to be understood that the invention is not limited to the particular circuit arrangement herein shown and described. Various modifications that may occur to those familiar with the design and construction of electronic apparatus fall within the spirit of my invention as set forth in the following claims.

I claim:

1. In a direct current electronic ammeter, a modulator having an input circuit to be connected in series with the circuit traversed by the current to be measured, a source of alternating current for excitation of said modulator, a rectifier for rectifying the output of said modulator, said rectifier having an output circuit including a voltmeter for measuring the voltage developed by the modulated output of said modulator, and means including a degenerating resistor connected between said rectifier output circuit and said modulator input circuit for establishing a condition of equality between the current to be measured and the degenerative current through said resistor, whereby the rectifier output voltage is a measure of the current input to said modulator.

2. In an electronic ammeter, the invention as recited in claim 1 wherein said degenerating resistor has an unavoidable distributed capacity to ground, and a small condenser is shunted across said resistor to establish a potential balance prior to the completion of the charging of said distributed capacity by the rectifier output.

3. In an electronic ammeter, the invention as recited in claim 1, in combination with means for terminating all supporting insulation in a leakage shield adjustable in potential to minimize insulation leakage.

4. In an electronic ammeter, the invention as recited in claim 1 wherein there are a plurality of degenerating resistors of different magnitudes, and switch means is provided for selectively connecting the desired one of said resistors in circuit to determine the measuring range of the ammeter.

5. In an electronic apparatus for measuring small direct currents, a modulator tube and means impressing an alternating current voltage upon an element thereof, input terminals connected to the cathode and a grid of the modulator tube, whereby the modulated output is proportional to the grid input, means for amplifying the modulated output, a rectifier tube working out of said amplifier means, a voltmeter in the output circuit of said rectifier, and a degenerative resistor connected between the rectifier output circuit and the grid of said modulator tube.

6. In an electronic apparatus for measuring small direct currents, the invention as recited in claim 5 wherein said degenerating resistor has an unavoidable distributed capacity to ground, and a small condenser is shunted across said resistor to establish the potential balance prior to the charging of said distributed capacity by the rectifier output.

ROSWELL W. GILBERT.